Nov. 21, 1933. B. C. VON PLATEN ET AL Re. 19,007

REFRIGERATION

Original Filed Jan. 25, 1928 2 Sheets-Sheet 1

INVENTORS
Baltzar Carl von Platen
Carl Georg Munters
BY
Harry Hollund
Their ATTORNEY Nov. 21, 1933. B. C. VON PLATEN ET AL Re. 19,007

REFRIGERATION

Original Filed Jan. 25, 1928 2 Sheets-Sheet 2

INVENTORS
Baltzar Carl von Platen
Carl Georg Munters
BY
their ATTORNEY

Reissued Nov. 21, 1933

Re. 19,007

UNITED STATES PATENT OFFICE 19,007

REFRIGERATION

Baltzar Carl von Platen and Carl Georg Munters, Stockholm, Sweden, assignors to Electrolux Servel Corporation, New York, N. Y., a corporation of Delaware Original No. 1,864,562, dated June 28, 1932, Serial No. 249,357, January 25, 1928. Application for reissue May 31, 1933. Serial No. 674,452

22 Claims. (Cl. 62—119.5)

Our invention relates to means for circulating fluid in refrigerating systems of the absorption type and the nature of the invention, its novelty and its advantages will be apparent from the following description taken in connection with the accompanying drawings on which:

Figure 1:
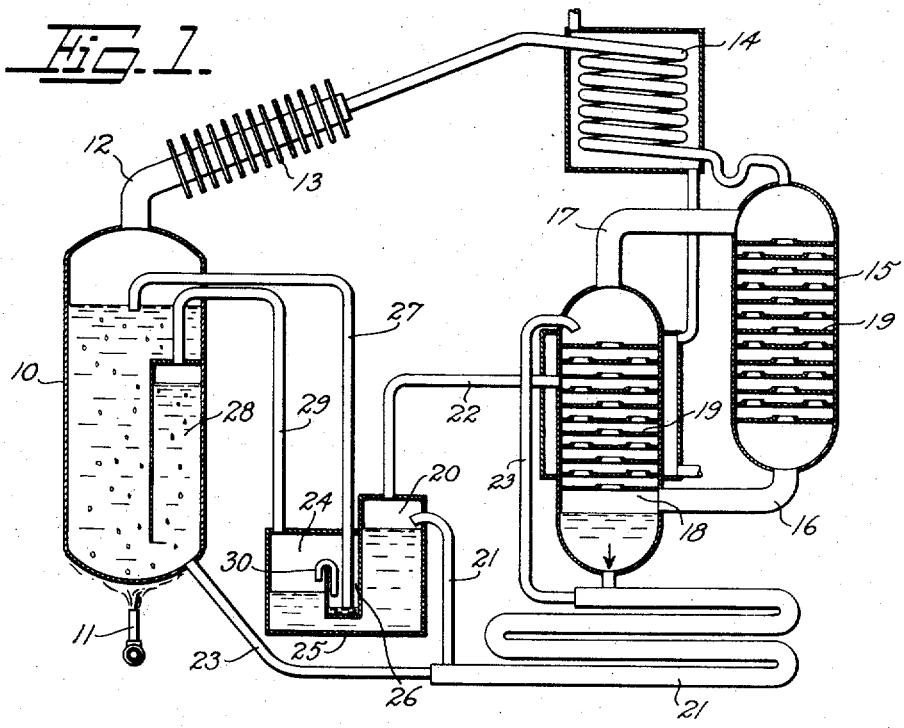
Fig. 1 shows a refrigerating system embodying one form of our invention.

Referring to Fig. 1 the refrigerating system comprises a generator 10 which is heated by a source of heat 11. The generator contains a cooling agent dissolved in absorption liquid. The cooling agent may be ammonia and the absorption liquid may be water. Ammonia vapor is driven out of absorption liquid in the generator and passes through conduit 12 and through rectifier 13 to condenser 14. In the condenser the ammonia is liquefied and passes into the evaporator 15 where it diffuses into an auxiliary agent such as hydrogen. Conduits 16 and 17 afford a circulation for the auxiliary agent between and through the evaporator 15 and the absorber 18. The evaporator and absorber contain disks 19 and may be made and operated as described in our Patent No. 1,609,334 of December 7, 1926.

Arranged outside the absorber is what we term an equalizer vessel 20. The term "equalizer vessel" is used because this vessel operates in conjunction with a periodical flow producing means to permit a constant level of liquid or a substantially constant level of liquid in the absorber. Vessel 20 is connected to the absorber by means of conduits 21 and 22. A part of conduit 21 is an outer conduit of a heat exchanger, the inner conduit 23 of which connects the lower part of the generator with the upper part of the absorber. Connected to vessel 20 is a pressure vessel 24. These vessels are connected at the bottom by a conduit 25 adapted to permit flow of liquid therethrough. Connected to the upper part of pressure vessel 24 is an overflow vessel 26. A riser pipe 27 projects downwardly into overflow vessel 26 and extends upwardly a considerable distance and has an upper opening inside the generator. Inside the generator is an auxiliary generator 28. The space surrounding auxiliary generator 28 may be considered as the main generator. A conduit 29 connects the upper part of the auxiliary generator 28 with the pressure vessel 24 and the connection is such, due to the open communication between vessels 24 and 26 that pressure generated in auxiliary generator 28 can be transmitted through conduit 29 to the inside of overflow vessel 26.

*In operation*

The apparatus in general operates as in our Patent No. 1,609,334 with the exception of the liquid circulation, wherefore the description of operation will be devoted to the liquid circulation cycle.

Assume that at a particular moment the lower opening of conduit 27 within vessel 26 is open so that a vapor generated in auxiliary generator 28 can pass through conduit 29 and through conduit 27 back to the generator. At this moment there is complete pressure equalization throughout the apparatus. Now assume that the liquid level in both vessels 20 and 24 rises. The liquid rises until the top point of siphon 30 is reached when a given amount of liquid is quickly transferred from chamber 24 into overflow vessel 26 and closes the lower opening of conduit 27. An excess of pressure is now generated in auxiliary generator 28 which acts through conduit 29 and acts against liquid in vessels 24 and 26. The result is a lowering of the levels in these chambers. The excess pressure is greater than the pressure in the generator proper and is counterbalanced by the difference of liquid level between the main generator and the auxiliary generator. The level falls until the upper end of the siphon 30 is uncovered. The liquid in overflow vessel 26 is now forced through conduit 27 by the excess pressure and into the generator. The excess of pressure causes a variation of liquid level in equalizer receptacle 20 but this does not cause a variation of level in the absorber due to the arrangement whereby the equalizer vessel is connected to the absorber to maintain the same vapor pressure and as conduit 21 is arranged to discharge into vessel 20 as indicated. The rise of pressure in the vessel 24 is balanced by the difference in liquid levels in vessels 24 and 20. Weak absorption liquid flows through conduit 23 from the bottom of the generator to the top of the absorber. When the liquid in overflow vessel 26 has been forced down and into conduit 27 so that the lower end of conduit 27 is uncovered, the liquid held in conduit 27 is discharged into the generator and equalization of pressure again takes place. The amount of liquid which is circulated can be regulated by properly dimensioning the proper vessels.

Figure 2:
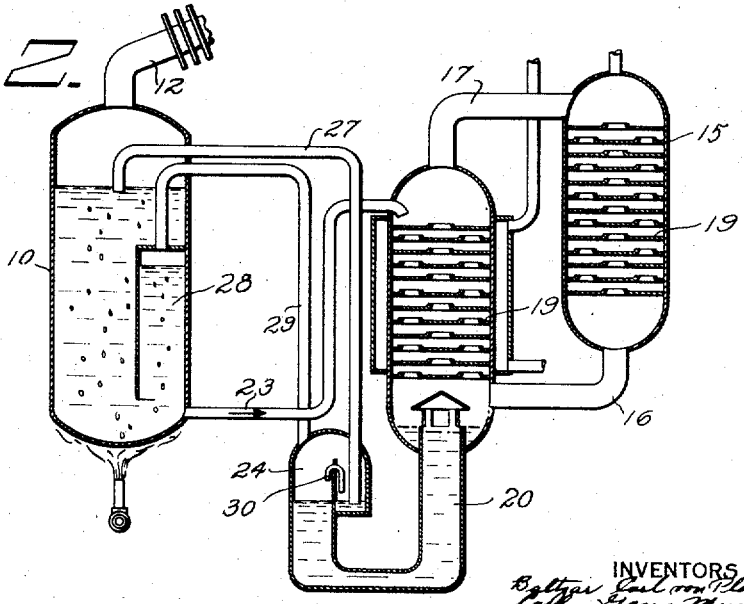
Fig. 2 shows a modified form.

Fig. 2 differs from Fig. 1 in that equalizer vessel 20 is connected directly to the absorber so that conduits 21 and 22 of Fig. 1 are unnecessary. An overflow over the edge of vessel 20 takes the place of conduit 21. The operation will be substantially the same as in the arrangement of Fig. 1.

Figure 3:
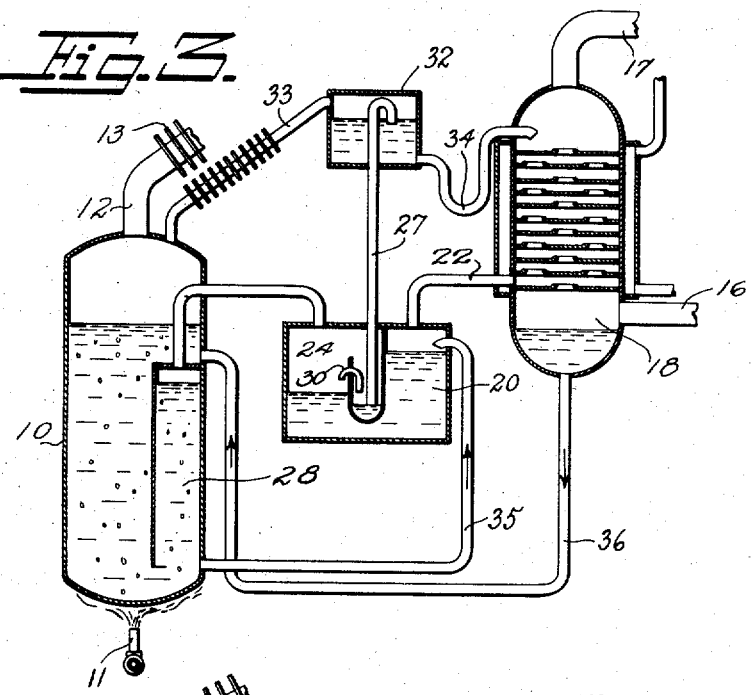
Fig. 3 shows still another form.

In Fig. 3 an arrangement is shown wherein the liquid lifted through conduit 27 is discharged into a vessel 32 from which gas is conducted to the generator through conduit 33 and absorption liquid is conducted through conduit 34 to the absorber. The vessel 20 in this case receives weak liquid from the generator through conduit 35 and the strong liquid is conducted from the bottom of the absorber through conduit 36 to the upper part of the generator. The liquid level in the absorber and in the main generator is the same in this arrangeemnt.

Figure 4:
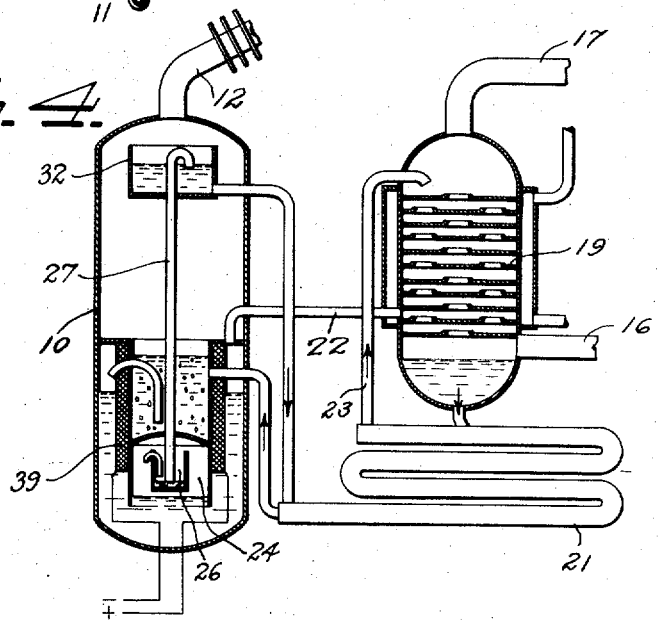
Fig. 4 shows a fourth form.

Fig. 4 shows an arrangement wherein the pressure vessel 24 and the overflow vessel 26 are both inside the generator. The generator is heated by means of an annular electric heat element 39. The heat element surrounds the vessel 24 so that this vessel as well as the generator is heated. The operation and the various parts of Fig. 4 will be readily understood from the previous description and particularly by reference to Fig. 3.

Having thus described our invention, what we claim is:

1. Absorption refrigerating apparatus comprising a generator, an absorber, an equalizer vessel, means affording communication between said absorber and said equalizer vessel arranged to permit a constant level of liquid in the absorber independently of variations of liquid level in the equalizer vessel, and means connected with the equalizer vessel for lifting liquid therefrom to above the level of liquid in the absorber and for conveying the liquid so lifted to the generator.

2. Absorption refrigerating apparatus comprising a generator, an absorber, means to generate an excess of gas pressure above the generator gas pressure, a pressure vessel, an equalizer vessel, a connection for flow of liquid between the pressure vessel and the equalizer vessel, an overflow vessel, means for relatively swiftly conducting liquid from the pressure vessel to the overflow vessel, means to impose the excess pressure generated on the contents of the overflow vessel, means for connecting the equalizer vessel and the absorber to permit variations of liquid level in the equalizer vessel while maintaining a substantially constant liquid level in the absorber and a riser pipe connected to the overflow vessel to carry liquid therefrom to a higher level than the liquid level of the absorber.

3. Absorption refrigerating apparatus comprising a generator, an absorber, means to generate an excess of gas pressure above the generator gas pressure, a pressure vessel, an equalizer vessel, a connection for flow of liquid between the pressure vessel and the equalizer vessel, an overflow vessel, means for relatively swiftly conducting liquid from the pressure vessel to the overflow vessel, means to impose the excess pressure generated on the contents of the overflow vessel, means for connecting the equalizer vessel and the absorber to permit variations of liquid level in the equalizer vessel while maintaining a substantially constant liquid level in the absorber, a riser pipe extending upwardly from within the overflow vessel and arranged to discharge into the generator and a conduit for conducting absorption liquid from the generator to the absorber.

4. Absorption refrigerating apparatus of the type wherein circulation of liquid is produced by periodic variation in pressure comprising a generator, an absorber, a pressure vessel connected between the absorber and the generator, an equalizer vessel connected between the absorber and the pressure vessel arranged to be supplied with liquid during rise of pressure during said variation of pressure and the parts being so connected that the said rise of pressure is produced in the pressure vessel and so that the rise of pressure is balanced by difference of liquid level in the pressure vessel and the equalizer vessel.

5. Absorption refrigerating apparatus comprising a generator, an absorber, means to generate an excess of gas pressure above the generator gas pressure, a pressure vessel, an equalizer vessel, a connection for flow of liquid between the pressure vessel and the equalizer vessel, an overflow vessel, a siphon for relatively swiftly conducting liquid from the pressure vessel to the overflow vessel, means to impose the gas pressure generated on the contents of the overflow vessel, means for connecting the equalizer vessel and the absorber to permit variations of liquid level in the equalizer vessel while maintaining a substantially constant liquid level in the absorber and a riser pipe connected to the overflow vessel to carry liquid therefrom to a higher level than the liquid level of the absorber.

6. In the art of refrigerating with a system of the pressure equalized absorption type, continuously conducting vapor from the generator to the condenser and circulating absorption liquid between the generator and absorber by collecting gas expelled from solution in the generator, separating weak absorption liquid from the generator and applying the pressure of the collected gas to the separated liquid to raise the latter to a level from which it flows to the absorber by gravity.

7. In the art of refrigerating with a system of the pressure equalized absorption type, continuously conducting vapor from the generator to the condenser and circulating absorption liquid between the generator and absorber by collecting gas expelled from solution in the generator, intermittently separating weak absorption liquid from the generator, and applying the pressure of the collected gas to the separated liquid to raise the latter to a level from which it flows to the absorber by gravity.

8. In the art of refrigerating with a system of the pressure equalized absorption type, continuously conducting vapor from the generator to the condenser and circulating absorption liquid between the generator and absorber by collecting gas expelled from solution in the generator, applying the pressure of the collected gas to a liquid pump chamber, conducting weak absorption liquid from the generator to said pump chamber by gravity, and intermittently relieving the pressure of the collected gas responsive to the pressure of the latter.

9. In refrigeration apparatus of the pressure equalized absorption type including a generator, an absorber, and a condenser in open communication with the vapor space in the generator, means for circulating absorption liquid between the generator and absorber comprising a vapor liquid lift connected to discharge into the absorber, a weak liquid supply line from the generator to said lift, means for accumulating below the liquid level vapor expelled from solution in the generator and applying the pressure of the accumulated vapor in said lift to discharge liquid therein into the absorber, and a vent associated with said means adapted to be opened responsive to increase of gas pressure in said means and closed responsive to decrease of gas pressure in said means.

10. In refrigeration apparatus of the pressure equalized type including a generator, an absorber, and a condenser in open communication with the vapor space in the generator, means for circulating absorption liquid between the generator and absorber comprising a vapor liquid lift adapted to discharge into the absorber, means for supplying weak absorption liquid from the generator to said lift responsive to liquid pressure in the generator, means for accumulating below the liquid level gas expelled from solution in the generator and applying the pressure of the accumulated gas in said lift to discharge liquid into the absorber, a liquid trap valve associated with last said means to relieve the gas pressure in the latter responsive to an increase in the same, and means for replacing liquid in said valve responsive to decrease of gas pressure in said gas accumulating means.

11. In the art of refrigerating with an absorption system including a generator, an absorber, and a condenser in open communication with the vapor space in the generator, withdrawing from the generator both weak absorption liquid and vapor and utilizing the latter to move the former into the absorber.

12. In the art of refrigerating with an absorption system including a generator, an absorber, and a condenser in open communication with the vapor space in the generator; forming a body of absorption liquid due to liquid head in the generator, producing a gas pressure greater than that in the generator and reacting against the liquid column in the generator, and flowing said body of liquid into the absorber under said gas pressure.

13. In the art of refrigerating with an absorption system including a generator, an absorber, and a condenser in open communication with the vapor space in the generator; forming a body of absorption liquid due to liquid head in the generator, collecting by displacement below the liquid level vapor expelled from solution in the generator, and applying the collected vapor to move said body of liquid upwardly into the absorber.

14. In the art of refrigerating with an absorption system including a generator, an absorber, and a condenser in open communication with the vapor space in the generator; forming a body of absorption liquid due to liquid head in the generator, collecting by displacement below the liquid level vapor expelled from solution in the generator, applying the collected vapor to move said body of liquid upwardly into the absorber, and intermittently relieving the pressure of the collected vapor to allow the reforming of said body of liquid.

15. In the art of refrigerating with an absorption system including a generator, an absorber, and a condenser in open communication with the vapor space in the generator; forming a body of absorption liquid due to liquid head in the generator, collecting by displacement below the liquid level vapor expelled from solution in the generator, applying the collected vapor to move said body of liquid upwardly into the absorber, balancing the pressure of the collected vapor by a liquid column, and intermittently displacing said column to relieve the pressure and allow reforming of said body of liquid and re-establishing said column with liquid from the generator.

16. In the art of refrigerating with an absorption system including a generator, an absorber, and a condenser in open communication with the vapor space in the generator; forming a body of absorption liquid due to liquid head in the generator, collecting by displacement below the liquid level vapor expelled from solution in the generator, applying the collected vapor to move said body of liquid upwardly into the absorber, balancing the pressure of the collected vapor by a liquid column, and intermittently displacing said column into the generator to relieve the pressure and allow reforming of said body of liquid and reestablishing said column with liquid from the generator.

17. In an absorption refrigerating system including a generator, an absorber, and a condenser in open communication with the vapor space in the generator; a closed vessel connected in the system to receive weak absorption liquid under a liquid head in the generator and discharge at a higher level into the absorber, and means for collecting below the liquid level vapor expelled from solution in the generator and directing the vapor into said vessel, the accumulation of vapor creating a pressure reacting against said liquid head and raising liquid from the vessel into the absorber.

18. In an absorption refrigerating system including a generator, an absorber, and a condenser in open communication with the vapor space in the generator; a closed vessel below the liquid level in the generator and connected to discharge at a higher level into the absorber, means for supplying weak absorption liquid to said vessel under a liquid head in the generator, and means for creating a gas pressure in said vessel reacting against said liquid head to raise liquid from the vessel into the absorber.

19. In an absorption refrigerating system including a generator, an absorber, and a condenser in open communication with the vapor space in the generator; a closed vessel below the liquid level in the generator and connected to discharge at a higher level into the absorber, means for supplying weak absorption liquid to said vessel under a liquid head in the generator, and means for intermittently creating a gas pressure in said vessel reacting against said liquid head to raise liquid from the vessel into the absorber.

20. In an absorption refrigerating system including a generator, an absorber, and a condenser in open communication with the vapor space in the generator; a closed vessel connected in the system to receive weak absorption liquid under a liquid head in the generator and discharge at a higher level into the absorber, means for collecting below the liquid level vapor expelled from solution in the generator and directing the vapor into said vessel, the accumulation of vapor creating a pressure reacting against said liquid head and raising liquid from the vessel into the absorber, and means for intermittently relieving the pressure of the accumulated vapor to allow re-filling of said vessel with liquid.

21. In an absorption refrigerating system including a generator, an absorber, and a condenser in open communication with the vapor space in the generator; a closed vessel connected in the system to receive weak absorption liquid under a liquid head in the generator and discharge at a higher level into the absorber, means for collecting below the liquid level vapor expelled from solution in the generator and directing the vapor into said vessel, the accumulation of vapor creating a pressure reacting against said liquid head and raising liquid from the vessel into the absorber, and a pressure relief vent from said vessel having a liquid trap seal adapted to be broken and re-filled with liquid from the generator responsive respectively to rise and fall of pressure in said vessel.

22. In an absorption refrigerating system including a generator, an absorber, and a condenser in open communication with the vapor space in the generator; a closed vessel connected in the system to receive weak absorption liquid under a liquid head in the generator and discharge at a higher level into the absorber, means for collecting below the liquid level vapor expelled from solution in the generator and directing the vapor into said vessel, the accumulation of vapor creating a pressure reacting against said liquid head and raising liquid from the vessel into the absorber, and a pressure relief vent from said vessel into the vapor space in the generator having a liquid trap seal adapted to be broken and re-filled with liquid from the generator responsive respectively to rise and fall of pressure in said vessel.

BALTZAR CARL VON PLATEN.
CARL GEORG MUNTERS.